United States Patent
Adatrao et al.

(10) Patent No.: US 7,681,009 B2
(45) Date of Patent: Mar. 16, 2010

(54) DYNAMICALLY UPDATEABLE AND MOVEABLE MEMORY ZONES

(75) Inventors: Ravi M. Adatrao, West Dundee, IL (US); Nagapraveen G. Kalla, Tinton Falls, NJ (US)

(73) Assignee: Motorola, Inc., Schaumburg, IL (US)

( * ) Notice: Subject to any disclaimer, the term of this patent is extended or adjusted under 35 U.S.C. 154(b) by 323 days.

(21) Appl. No.: 11/617,020

(22) Filed: Dec. 28, 2006

(65) Prior Publication Data

US 2008/0162783 A1 Jul. 3, 2008

(51) Int. Cl.
*G06F 12/00* (2006.01)
(52) U.S. Cl. .................. 711/170; 711/103; 711/165; 717/168; 365/185.33
(58) Field of Classification Search .................. 711/170, 711/103, 165; 365/185.33; 717/168
See application file for complete search history.

(56) References Cited

U.S. PATENT DOCUMENTS 6,205,548 B1 * 3/2001 Hasbun .................. 713/2
7,089,549 B2 * 8/2006 Venkiteswaran ............ 717/170
2004/0040020 A1 2/2004 Yang
2004/0243992 A1 * 12/2004 Gustafson et al. ........... 717/168
2006/0036802 A1 * 2/2006 Drukin ...................... 711/103

FOREIGN PATENT DOCUMENTS

| EP | 1569102 A | 8/2005 |
| WO | 2005048075 A | 5/2005 |
| WO | 2005074621 A | 8/2005 |

* cited by examiner

*Primary Examiner*—Stephen C Elmore
(74) *Attorney, Agent, or Firm*—Joseph T. Cygan

(57) ABSTRACT

A command is received to perform an update operation on a first component of code contained in a plurality of memory blocks in a memory. It is determined whether or not the update operation requires additional space, beyond that which is already allocated to the first component, to complete the operation. A first memory block is located on which to perform the operation if the update operation requires additional space. A second memory block is located, through utilization of a database, to perform the operation if the update operation does not require additional space. The update operation is performed.

8 Claims, 5 Drawing Sheets

DYNAMICALLY UPDATEABLE AND MOVEABLE MEMORY ZONES

FIELD

The present application relates generally to electronic devices and more particularly to electronic devices having dynamically updateable moveable memory zones.

BACKGROUND

During the lifetime of a device, it is often necessary to update various code components (e.g. code, file systems, etc.) that are stored in the device's memory. Devices generally employ various update technologies (hereinafter referred to as "update agents") to update their code components. During an update, an update agent will retrieve the code component from a source zone in a device memory and perform various operations, such as writing, reading, and erasing, on the individual code elements that are stored in the memory blocks of the device's memory. The update agent might also add code or remove code from code components, thereby increasing or decreasing the size of a code component.

During an update, it is important that an update agent not corrupt other code components. For instance, it would be problematic if an update agent were to expand one code component into the space of another code component. Accordingly, devices partition their memories into static zones. Each component is provided with one or more static zones. If an update to a particular component occurs, the update agent will only read code elements from, and write code elements to, the memory blocks allocated to that particular code component. Similarly, if the update agent needs to expand the code component, the update agent will only write the additional elements to free blocks allocated to the component. This approach is inflexible, complicated, and does not optimize the data storage. Therefore, there is a need for dynamically updateable and moveable memory zones.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

In one example, a method is provided. A command is received to perform an update operation on a first component of code contained in a plurality of memory blocks in a memory. It is determined whether or not the update operation requires additional space, beyond that which is already allocated to the first component, to complete the operation. A first memory block is located on which to perform the operation if the update operation requires additional space. A second memory block is located, through utilization of a database, on which to perform the operation if the update operation does not require additional space, and the update operation is performed.

In one example, a device is provided. A flash memory includes a plurality of code components stored in a plurality of memory blocks. A database includes the location in the flash memory of each of the code components. An update manager is configured to manage updates of each of the code components. A flash manager governs access to the flash memory.

In one example, a method of booting the device is provided. The location of each of the elements of the first component and each of the elements of the second component is requested from the flash manager. The elements of the first component are stored in a contiguous manner in a random access memory. The elements of the second component are stored contiguously in the random access memory.

In another example, a method of operating the device is provided. The location of an element En of the first component is requested from flash manager. The location of another element E(n+1) of the first component is requested from the flash manager. It is determined whether or not En and E(N+1) are contiguous within the flash memory. If they are not contiguous, E(n+1) is relocated such that it is contiguous to En within the flash memory. The location of E(n+1) is stored in the database. The preceding steps are repeated until the first component is contiguous. The preceding steps are repeated until the second update component is contiguous.

Figure 1:
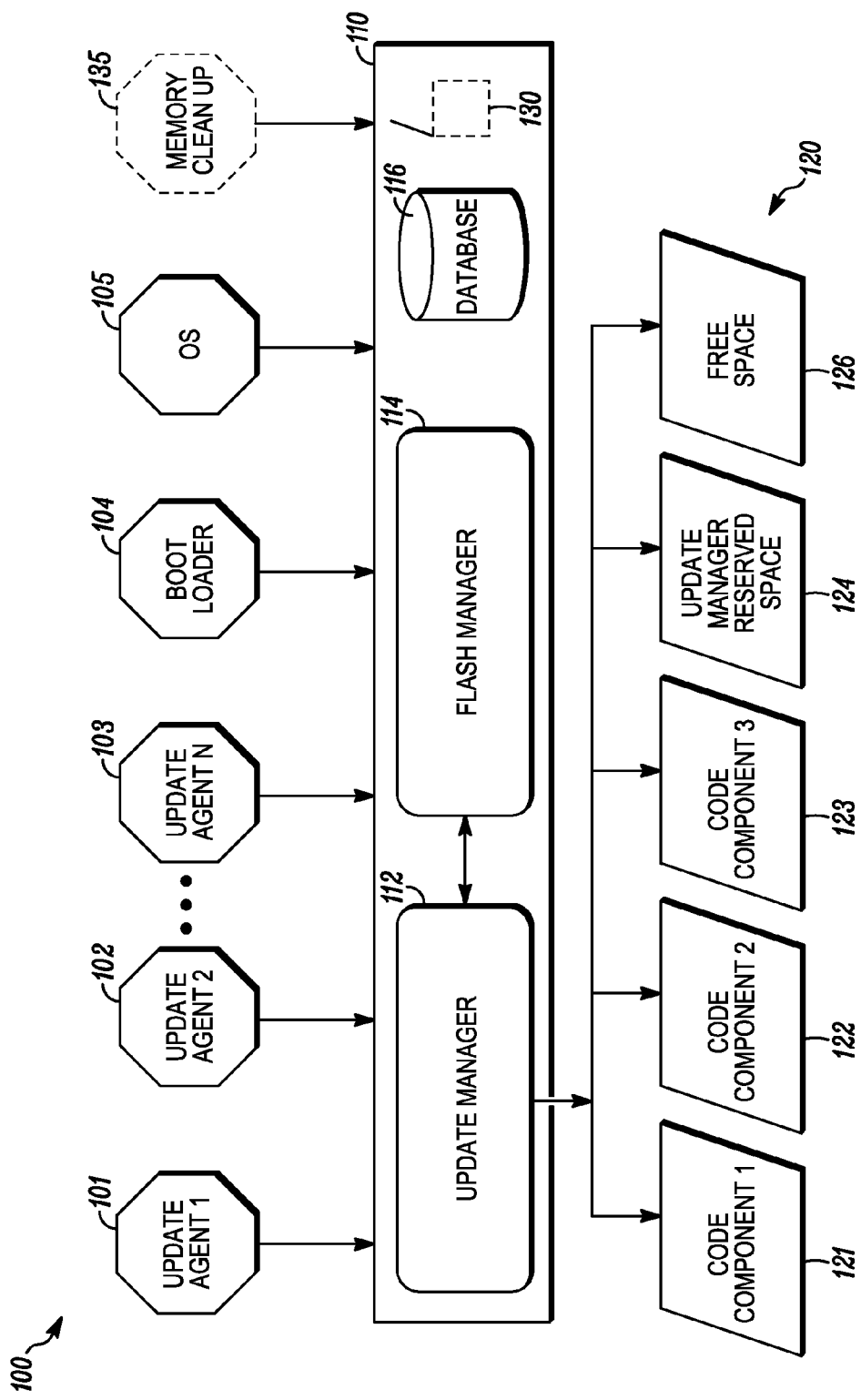
FIG. 1 is a functional block diagram depicting one example of a device that is employable to provide dynamically updateable and moveable memory zones.

Referring to FIG. 1, an illustrative embodiment of a device 100 is provided. Device 100 in one example comprises a portion of an electronic computing device. Device 100 could be a stand alone device or a device capable of communicating with one or more other devices, either directly or over a network. Examples of such devices include, but are not limited to, mobile phones, pagers, radios, personal digital assistants (PDAs), mobile data terminals, desktop computers, laptop computers, application specific gaming devices, video gaming devices, and combinations or subcombinations of these devices. Such devices generally include components such as processors, controllers, memory components, user interface devices, data transmission logic, network interfaces, antennas, and the like. The design and operation of these devices is well known so a detailed description of each possibility will be omitted. However, those components necessary to fully describe the claimed subject matter are shown.

Further referring to FIG. 1, the components of device 100 are formed of one or more computer software and/or hardware components. A number of such components can be combined or divided. In one example, an exemplary component of each device employs and/or comprises a series of computer instructions written in or implemented with any of a number of programming languages, as will be appreciated by those skilled in the art.

Device 100 can employ at least one computer-readable signal-bearing medium. An example of a computer-readable signal-bearing medium is a recordable data storage medium, such as a magnetic, optical, and/or atomic scale data storage medium. In another example, a computer-readable signal-bearing medium is a modulated carrier signal transmitted over a network. A computer-readable signal-bearing medium can store or transport software and/or logic components that are employable to carry out the functionality described herein.

Device 100 could be a stand alone device or it could be capable of communication over one or more wireless or wired networks (e.g., a Local Area Network ("LAN"), a Wide Area Network ("WAN"), a wireless LAN, a wireless WAN, the Internet, a wireless telephone network, etc.). Examples of wireless networks include networks that employ one or more radio access technologies (RAT). Examples of RATs include, but are not limited to, UTRA (UMTS Terrestrial Radio Access, in which UMTS is Universal Mobile Telecommunications System), CDMA2000® (in which CDMA is Code Division Multiple Access), Global System for Mobile Communications (GSM), GSM EDGE Radio Access (GERAN), which EDGE is Enhanced Data for GSM Evolution and GERAN is GSM/EDGE Radio Access Network. RATs in one example use spread spectrum modulation formats (e.g. CDMA, Orthogonal Frequency Division Multiple Access (OFDMA)) and non-spread spectrum (e.g. Time Division Multiple Access (TDMA), Frequency Division Multiple Access (FDMA)) modulation formats and variations and evolutions thereof. In addition, the device 100 could be capable of communicating directly with other devices through the formation of ad hoc networks. Such networks can be formed through the utilization of wired or wireless (e.g. BLUETOOTH®) technology.

Referring further to FIG. 1, device 100 in one example includes at least one update agent 101, 102, 103, a boot loader 104, an operating system 105, a management layer 110, and a memory 120.

Management layer 110, in one example, comprises update manager 112, flash manager 114, and database 116. Memory 120 in one example includes a plurality of code components 121, 122, 123, reserved space 124 for the update manager 112, and free space 126. Memory 120 in one example comprises a flash memory although it is not limited to flash memory. Various other types of memory, such as magnetic, optical, and/or atomic scale data storage mediums, could also be used by device 100.

Update agents 101, 102, 103 each serve to update a corresponding code component 121, 122, 123. Update agents 101, 102, 103 can be provided to device 100 in a number of ways. For instance, an update agent can be transmitted to device 100 either directly, or over a network. Alternatively, the update agent could be provided to device 100 manually by the user of the device (e.g., through the transfer of the update agent to the device 100 via a data storage medium). The function of the update agents 101, 102, 103 is to update a particular code component 121, 122, 123, through operations, such as writing to, erasing, and overwriting the memory blocks that contain the elements of the code component.

Referring further to FIG. 1, boot loader 104 is utilized by device 100 to load operating system 105. Operating system 105 is utilized by device to manage the hardware and/or software components of device. Boot loaders and operating systems are well known so a further discussion of each will be omitted except insofar as it is necessary to describe the subject matter herein.

Management layer 110 comprises software and/or hardware that device 100 utilizes to manage the memory 120. Such functionality includes managing updates to code components 121, 122, 123, accessing memory 120 by boot loader 104, and accessing memory by OS 105. In one example, management layer also maintains memory 120 such that the elements of code components are stored in a contiguous manner. Three exemplary components of management layer include update manager 112, flash manager 114, and database 116.

Update manager 112 in one example is a hardware and/or software component that manages the update of components by update agents 101, 102, 103. Exemplary functions of the update manager 112 include, but are not limited to, maintaining the component locations (e.g. start/end component addresses) throughout the lifetime of the device 100; coordinating all device reads, writes, and erases triggered by any update agents 101, 102, 103, boot loader 104, and OS 105; dynamically managing space in memory 120 that is allocated to components 121, 122, 123; and maintaining an translation table that is utilized by device 100 during operation. Each of these functions will be further described herein.

Flash manager 114 in one example is a file system manager that device 100 utilizes to manage memory 120. Flash manager 114 keeps track of the contents of each memory block that comprises memory 120 and controls access to memory 120 by the other components of device 100.

Database 116 in one example is utilized by device 100 to store an address translation table. Device 100 uses the address translation table to keep track of the various elements of code components 121, 122, 123 to insure that device 100 has access to these elements at any given time and throughout the life of the device, as will be further described herein.

Referring further to FIG. 1, memory 120 includes code components 121, 122, 123, reserved space 124 for the update manager 112, and free space 126. As was discussed earlier, code components 121, 122, 123 in one example are binary components that represent software and/or data. Reserved space 124 comprises memory block(s) that are allocated to update manager 112 to use when updating code components and/or maintaining memory 120. Free space 126 comprises memory blocks that have not been used by device 100.

It should be noted that the preceding description of management layer 110 is for exemplary purposes only. The components of management layer 110 can be combined or divided as needed by the manufacturers, designers, and end users of device 100.

Figure 2A:
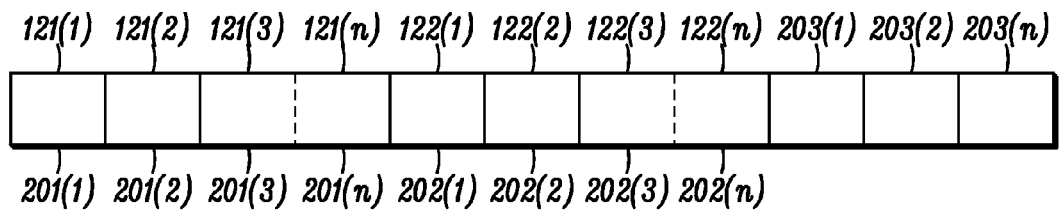
FIGS. 2a-2c each depict individual memory blocks in a portion of the memory shown in FIG. 1.

Referring to FIG. 2A, a portion 200 of memory 120 is now shown for illustrative purposes to explain how device 100 utilizes management layer 110 to manage memory 120. Memory 120 includes a plurality of memory blocks. Components 121, 122 are shown stored in the memory blocks. Component 121 is stored in blocks 201(1)-201(n). Component 122 is stored in blocks 202(1)-202(n). Component 121 comprises a plurality of code elements 121(1)-121(n), and component 122 comprises a plurality of code elements 122(1)-122(n). Free space 203 includes blocks 203(1)-203(n), which are not in use by device 100.

When an update occurs, it is possible that component 121 or 122 may increase in size, decrease in size, or stay the same. If a component stays the same, then its update agent can simply overwrite the memory blocks allocated to it. For instance, if update agent 101 were updating component 121 and component 121 were to remain the same size, then update agent 101 could simply utilize blocks 201(1)-201(n) for the update and no additional space would be needed. However, if update agent 101 were planning to expand component 121, then additional space would be needed.

Figure 2B:
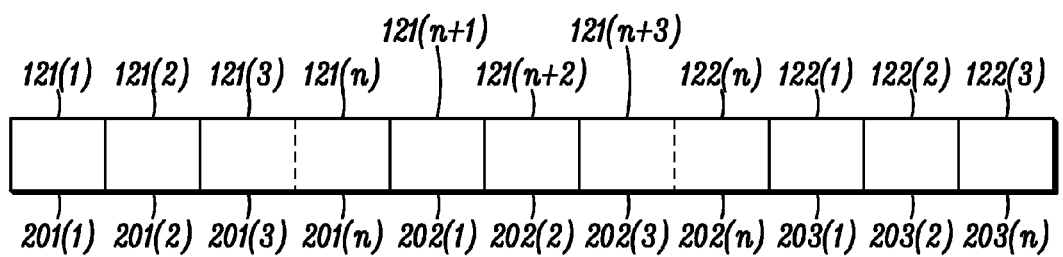

For example, referring to FIG. 2b, if update agent 101 were to add an additional three elements 121(n+1), 122(n+2), 122(n+3) to component 121, then update agent would need three additional blocks in memory 120. In the conventional approach, device 100 would allocate a portion of memory 120 to component 121 for future updates. Update agent 101 would then write the additional elements to this predefined place in memory 120. In the present application, however, rather than predefining a place in memory 120 for future updates, update manager 112 will relocate elements 122(1)-122(3) to blocks 203(1)-203(3) of free space 203, and store the additional elements 121(n+1), 122(n+2), 122(n+3) in blocks 202(1)-202 (3), which previously contained elements 122(1)-122(3). Update manager will then make an entry in the address translation table in database 116 identifying elements 122(1)-122 (3) and including pointers to blocks 203(1)-203(3).

Subsequently, if another process, such as update agent 102, boot loader 104, or OS 105 wanted to access component 122, it would request the content of blocks 202(1)-202(n) through management layer 110 (e.g. through update manager 112 in the case of an update or flash manager 114 in the case of boot loader 104 and OS 105). Management layer 110 would refer to the address translation table. The address translation table would indicate that elements 122(1)-122(3) were stored in blocks 203(1)-203(3). The process would then utilize elements 122(1)-122(3) just as if they were stored in the previous location.

If, on the other hand, during the update of component 121, no components were moved or added, then during a subsequent process requests for code elements 122(1)-122(n), management layer 110 would refer to the address translation table and determine that the elements were in their original location, i.e. blocks 202(1)-202(n). Thus, management layer serves as an intermediary between processes, such as update agents 101, 102, 103, and code components 121, 122, 123. Accordingly, there is no need for device 100 to allocate fixed pools of memory to each component. Instead, the code components have access to the entirety of memory 120, and management layer 110 will manage and track the location of the each memory component.

After a number of such updates, various elements of components 121 and 122 can be interleaved throughout memory 120. Accordingly, the device 100 includes a process to clean up memory 120. A memory clean up 102 can occur by swapping the contents of the blocks containing components 121, 122, both with each other and with free blocks, until each of the components 121, 122 are contiguous. Management layer 110 could include a memory cleanup module 130 that performs the memory cleanup process. Alternatively, the memory clean up process could be a code component 135, located in the memory of device 100, and executable on a processor, such as its CPU, that performs the memory clean up process. As a further alternative, update manager 112 or flash manager could perform the memory clean up.

Figure 2C:
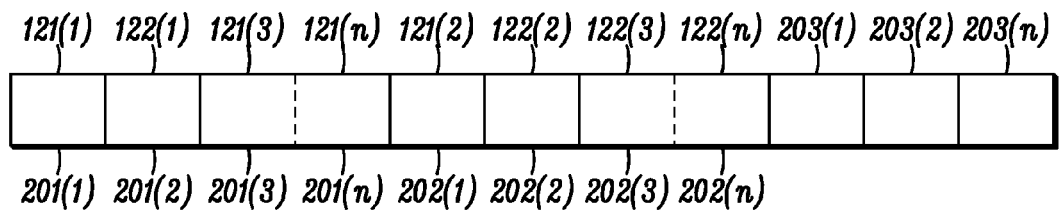

Referring to FIG. 2c, the memory clean up process is performed by swapping the contents of memory blocks in memory 120. For example, the process will identify the contents of a block and then determine if the elements in the blocks adjacent to the block are contiguous with respect to content.

Referring to FIG. 2c, it can be seen that component element 121(1) is located in block 201(1). During a clean up process, it would be determined whether the content of block 201(2) is the next element of component 121 (i.e. 121(2)). In FIG. 2c, however, element 122(1) is located in block 201(2). Element 121(2) is located in block 202(1). Accordingly, the process swaps the contents of blocks 202(1) and block 201(2). Blocks 201(1) and 201(2) will then have contiguous content. The process then will repeat the process until blocks 201(1)-201(n) have contiguous content. When blocks 201(1)-201(n) have contiguous content, the process will repeat for blocks 202(1)-202(n), and so forth throughout the entirety of the components in memory 120.

The above example is rudimentary in that only a simple two way swap is necessary to render blocks 201(1) and 201(2) contiguous. As another example, multiple swaps might be necessary to render the content contiguous. In yet another example, the process could avail itself of free space to complete the clean up process. For instance, upon realizing that block 201(2) contained a non-contiguous element, the process could move the element contained therein to free space and insert element 121(2) into block 201(2). The process could then repeat the process with block 201(3). In this way, a pool of displaced elements would build in the free space. The process could first review this pool when trying to locate an element for a particular block. The examples provided are for illustrative purposes only. It should be understood that other sorting algorithms could be used to the same effect.

Figure 3:
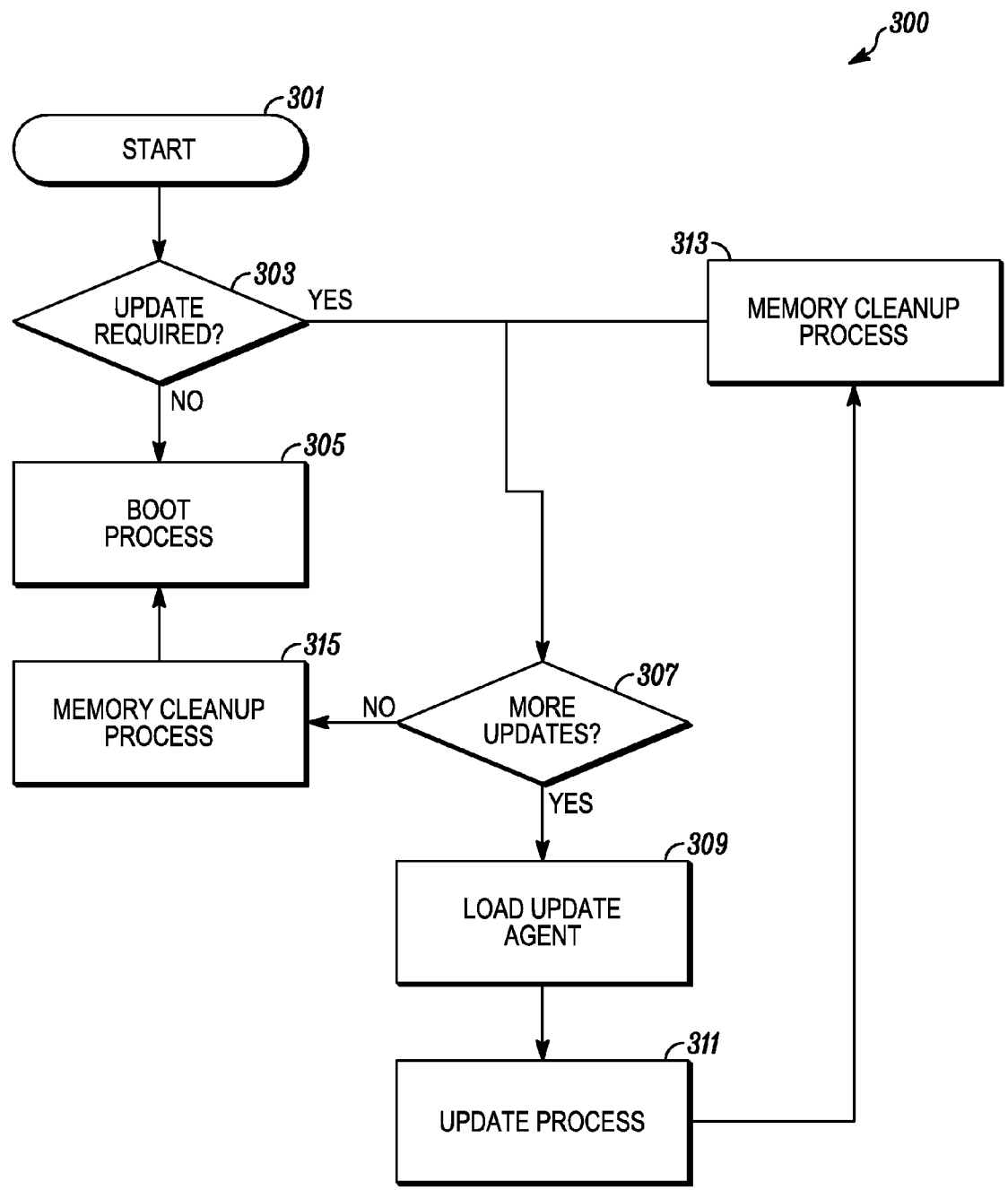
FIG. 3 is a flowchart depicting one example of a method of operation of the system of FIG. 1.

Referring to FIG. 3, an exemplary process 300 for the operation of device 100 will now be described for illustrative purposes.

In step 301, the process begins. In one example, the process 300 begins in response to the device being powered on. In another example, the process 300 begins as result of user initiation. In a further example, the process 300 begins as a result of network or provider initiation. In step 303, the device 100 determines whether an update is needed. For example, this might occur if an update agent begins execution. If an update is needed, then flow proceeds to the decision block 307 where it is determined if there is an update agent to load. If there is an update to load, then the update agent is loaded in step 309. In step 311, the update process executes. When the update is complete, the memory clean up process is executed in step 313. Flow returns to decision block 307 where another determination is made as to whether there are more updates to execute. If the answer is no, then in step 315, the memory clean up process is performed, and then flow proceeds to the boot up process.

Figure 4:
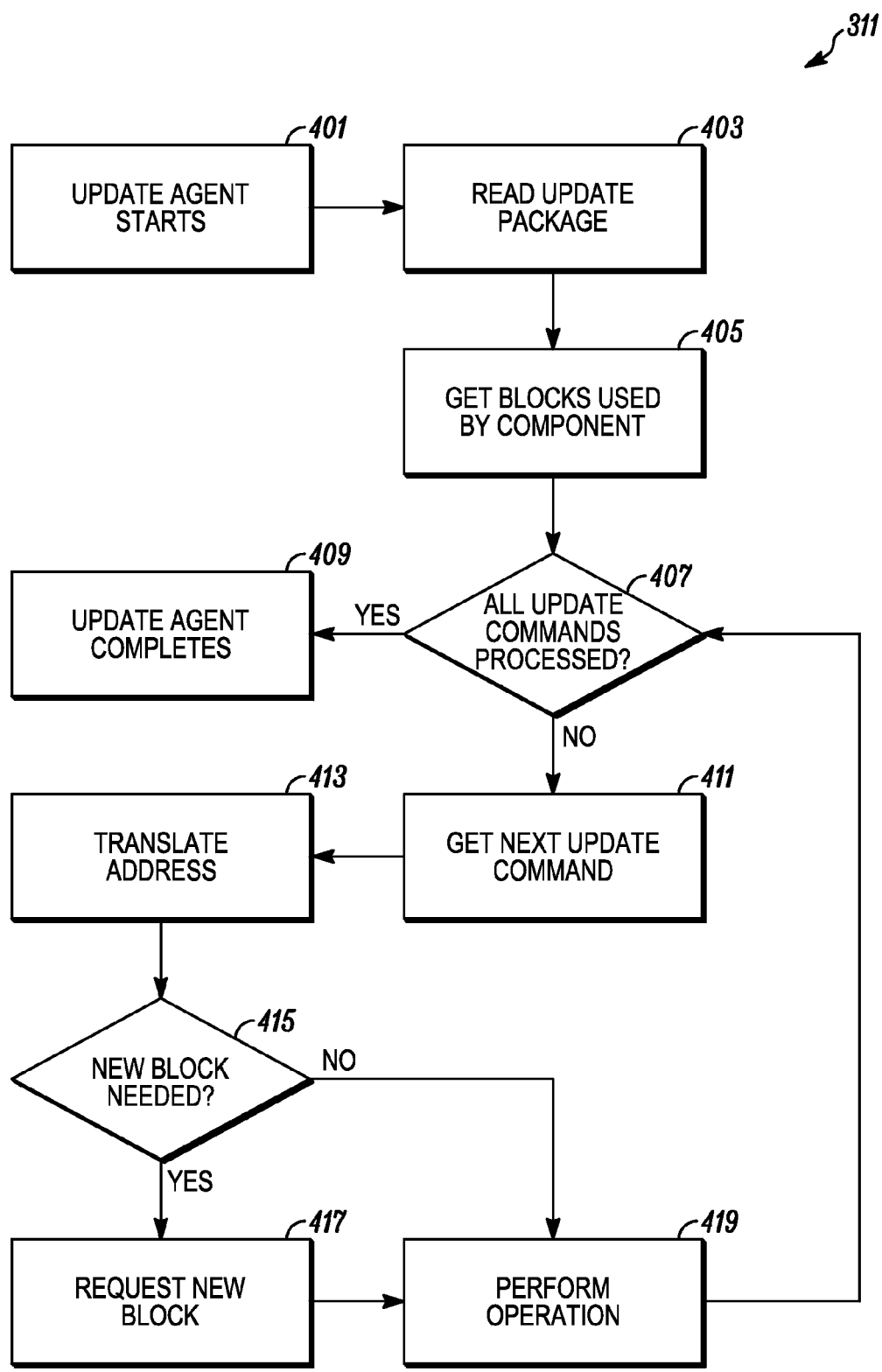
FIG. 4 is a flowchart depicting one example of an update process in the method of FIG. 3.

Referring to FIG. 4, an exemplary description of the update process 311 is now described for exemplary purposes. In step 401, the update agent starts. In step 403, the update package is read by the update manager 112. In step 405, the update agent requests, from flash manager 114, the memory blocks that are allocated to the component undergoing the update. In step 407, the update agent determines whether all of the update commands have been processed. If all of the update commands have been processed, then the update agent completes operation in step 409. Otherwise, the first update command is processed in step 411. The update manager 112 sends the first command to update manager 112. Exemplary update commands include reading, writing, and erasing the content of a particular memory block. Update manager 112 in step 413 translates the address by referring to the address translation table in database 116 to determine the actual location of the block that is the subject of the update command. In step 415, update manager 112 determines whether additional space is needed. If additional space is needed, then in step 417, the update manager requests an additional block(s) from flash manager 114. In step 419, the update manager 112 performs the update operation and updates the address translation table. If additional space is not needed, then flow proceeds directly to step 419.

Figure 5:
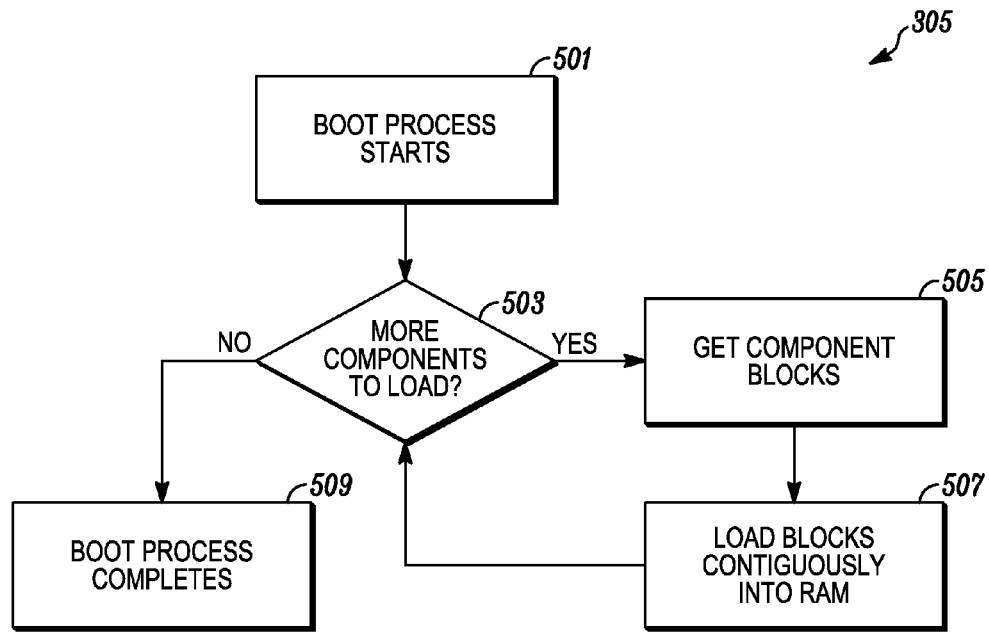
FIG. 5 is a flowchart depicting one example of a boot up process used in the method of FIG. 3.

Referring to FIG. 5, an exemplary description of boot process 305 is shown for exemplary purposes. In step 501, the boot process 305 begins execution. In step 503, a determination is made as to whether there are any code components to load into RAM. If there are components to load, the boot process 305 requests the components blocks from flash manager 114. Flash manager 114 refers to the address translation table in database 116 to locate the actual the locations of the component blocks. The boot process 305 retrieves the component blocks in step 505. The boot process 305 loads the content of the component blocks, in a contiguous manner, into RAM in step 507. Flow returns to step 503 in which it is determined whether there are more code components to load. If there are no components to load, then, in step 509, the boot process completes.

Figure 6:
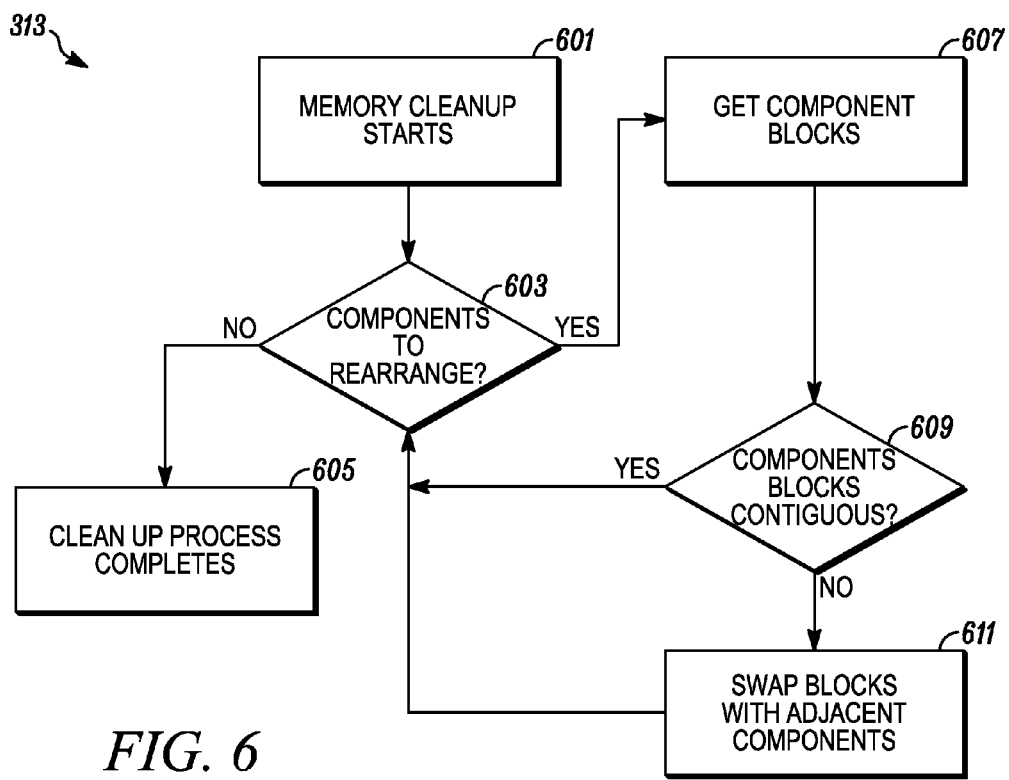
FIG. 6 is a flowchart depicting one example of a memory clean up process used in the method of FIG. 3.

Referring to FIG. 6, an exemplary description of the clean up process 313 is now described for exemplary purposes. In step 601, the memory clean up process 313 begins. In step 603, the process 313 determines whether there are components to rearrange. That is, the process 313 determines whether the content in the memory blocks is contiguous. If the answer is yes, then in step 605, the process 313 completes. Otherwise, in step 607, the process 313 begins to read component blocks by referring to the address translation table to determine the actual location of the component blocks. In step 609, the process 313 determines whether the content of the blocks is contiguous. In step 611, if the content of the blocks is not contiguous, then the swapping process outlined in FIGS. 2a through 2c is performed. Flow then returns to step 603 where it is determined whether there any other code components to rearrange.

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A device, comprising;
 a flash memory that includes a plurality of code components stored in a plurality of memory blocks, wherein the flash memory includes a first plurality of memory blocks holding elements of a first code component and a second plurality of memory blocks holding elements of a second code component, wherein the first plurality of code components are interleaved with the second plurality of code components;
 a database that includes the location in the flash memory of each of the code components;
 an update manager that is configured to manage updates of each of the code components; and
 a flash manager that governs access to the flash memory.

2. The device of claim 1, wherein the update manager is configured to receive a command from at least one update agent to perform an update operation to a first code component; to determine whether or not the update operation requires additional space, beyond that which is already allocated to the first component, to complete the operation; to request a first memory block, from the flash manager, on which to perform the operation if the update operation requires additional space; and to utilize the database to locate a second memory block, to perform the operation if the update operation does not require additional space.

3. The device of claim 2, wherein if the update operation requires additional space, the update manager is configured to select a used memory block, which is being utilized by a second code component and is contiguous to the first code component; as the first memory block; to relocate contents of the used memory block to a third memory block; to perform the operation on the first memory block; and to store in the database an identifier and location for contents of both the first memory block and the third memory block.

4. The device of claim 2, wherein if the update operation does not require additional space, the update manager is configured to receive a target memory block on which to perform the operation, to search the database for the target memory block, to select the target memory block as the second memory block if the target memory block is not located in the database, and to perform the operation on the second memory block.

5. The device of claim 4, wherein if the target memory block is located in the database, the update manager is configured to locate a corresponding memory block that is non-contiguous to the first code component; to select the non-contiguous memory block as the second memory block; to perform the operation on the second memory block; and to store in the database a location of the second memory block, and an identifier of contents of the second memory block.

6. The device of claim 1, wherein the database includes a data table, wherein the data table includes an identifier and location for each of the elements of the first code component and an identifier and location for each of the elements of the second code component.

7. A method of booting the device of claim 6, comprising:
 requesting the location from the flash manager of each of the elements of the first component and each of the elements of the second component;
 storing the elements of the first code component in a contiguous manner in a random access memory; and
 storing the elements of the second code component contiguously in the random access memory.

8. A method of operating the device of claim 1, the method comprising:
 a) requesting the location of an element $E_n$ of the first component from flash manager;
 b) requesting the location of another element $E_{(n+1)}$ of the first component form the flash manager;
 c) determining whether or not $E_n$ and $E_{(N+1)}$ are contiguous within the flash memory;
 d) relocating $E_{(n+1)}$ such that it is contiguous to $E_n$ within the flash memory if they are not contiguous;
 e) storing the location $E_{(n+1)}$ in the database; and
 f) repeating steps a) through e) until the first component is contiguous;
 g) repeating steps a) through f) for the second update component.

* * * * *